INVENTOR.
GEORGE T. KOKOTAILO

United States Patent Office 3,528,615
Patented Sept. 15, 1970

3,528,615
METHOD OF REDUCING PARTICLE SIZE OF CRYSTALLINE ZEOLITES
George T. Kokotailo, Woodbury, N.J., assignor to Mobil Oil Corporation, a corporation of New York
Filed June 16, 1967, Ser. No. 646,724
Int. Cl. B02c *19/00, 19/18*
U.S. Cl. 241—1    10 Claims

ABSTRACT OF THE DISCLOSURE

Method of reducing the particle size of a crystalline zeolite while substantially maintaining its crystallinity involving heating the zeolite to an elevated temperature below that temperature at which loss of crystallinity occurs and thereafter quenching the heated zeolite in a liquid medium. The resulting thermal shock to the zeolite results in a reduction of particle size. The heating-quenching cycle may be repeated, as desired, to further reduce particle size.

BACKGROUND OF THE INVENTION

Field of the invention

This invention broadly relates to the field of both natural and synthetic crystalline zeolites. The most common of such zeolites are the natural and synthetic crystalline aluminosilicates, which may generally be described as aluminosilicates of ordered internal structure having the following general formula:

$$M_{2/n}O:Al_2O_3:YSiO_2:ZH_2O \qquad (I)$$

where M is a cation, $n$ is its valence, Y the moles of silica, and Z the moles of the water of hydration.

When water of hydration is removed from the crystalline aluminosilicates, highly porous crystalline bodies are formed which contain extremely large adsorption areas inside each crystal. Cavities in the crystal structure lead to internal pores and form an interconnecting internal network of passages. The pores open through the external surfaces of the crystal. The size of the pores is substantially constant, and this property has led to the use of crystalline aluminosilicates for the separation of materials according to molecular size or shape. For this reason, the crystalline aluminosilicates have sometimes been referred to as molecular sieves. They are also zeolitic.

The crystalline structure of such molecular sieves consists basically of three-dimensional frameworks of $SiO_4$ and $AlO_4$ tetrahedra. The tetrahedra are cross-linked by the sharing of oxygen atoms, and the electrovalence of the tetrahedra containing aluminum is balanced by the inclusion in the crystal of a cation (M in Formula I), e.g., alkali metal or alkaline earth metal ions or other cationic metals and various combinations thereof. These cations are generally readily replaced by conventional ion-exchange technqiues.

The spaces in the crystals between the tetrahedra ordinarily are occupied by water. When the crystals are treated to remove the water, the spaces remaining are available for adsorption of other molecules of a size and shape which permits their entry into the pores of the structure.

The invention also finds application with respect to crystalline zeolites other than crystalline aluminosilicates, e.g., galliosilicates, galliogermanates, aluminogermanates, and the like. See, e.g., Barrer et al., J. Chem. Soc. (1959), page 195.

Such crystalline zeolites or molecular sieves have found application in a variety of processes which include ion exchange, selective adsorption and separation of compounds having different molecular dimensions such as hydrocarbon isomers, and in catalysts for the catalytic conversion of organic materials, especially catalytic cracking, hydrocracking, isomerization, and alkylation processes.

DESCRIPTION OF THE PRIOR ART

Crystalline zeolites of the foregoing type, e.g., crystalline aluminosilicate zeolites such as synthetic faujasite, under normal conditions will crystallize as discrete particles of from about 1 to 10 microns in size. The crystals are fairly regularly shaped.

As is well known, catalysts utilizing such zeolite crystals as the active component are most useful in the petroleum industry. The surface area of such crystalline zeolites will influence the catalytic activity of the overall catalyst.

Crystalline zeolites exhibit both an internal and an external surface area, with the largest portion of the surface area being internal. Blockage of the internal channels, as by coke formation, poisoning of the catalyst, lattice imperforations, or the like, will reduce the surface area considerably. Accordingly, if the crystalline zeolite particles were to be reduced in size so as to increase the ratio of external to internal surface area, the problem of channel blockage would be lessened, and additionally, the problem of diffusion to the interior surface area would be somewhat reduced.

Heretofore it has been attempted to reduce particle size, and hence to increase the ratio of external to internal surface area, as by grinding crystalline zeolite particles, subjecting such particles to mechanical pressure, or the like. Unfortunately, however, such prior art techniques have been found to substantially reduce or altogether destroy the crystallinity of the zeolite particles.

SUMMARY OF THE INVENTION

According to the present invention, a method has been developed for reducing the partice size of a crystalline zeolite to thereby increase the ratio of external surface area to internal surface area, without significantly reducing the crystallinity of the zeolite. This method involves heating the crystalline zeolite to an elevated temperature below that temperature at which loss of crystallinity occurs, for example, 600° C., desirably for a few minutes, and thereafter quenching the so heated zeolite in a liquid medium maintained at a temperature below said elevated temperature. The thermal shock fractures the zeolite to produce smaller crystals yet does not significantly reduce crystallinity. The sequence of heating-abrupt cooling may be repeated to further reduce particle size of the crystalline zeolite.

The resulting product exhibits a reduced particle size as compared to the initial crystalline zeolite. Moreover, the ratio of external to internal surface area of such product is significantly higher than the corresponding ratio for the initial crystalline zeolite. Finally, this increase in ratio is achieved without significant loss in crystallinity of the so treated zeolite.

BRIEF DESCRIPTION OF THE DRAWINGS

The invention will be best understood by the following detailed description, taken in conjunction with the drawings wherein.

DESCRIPTION OF THE SPECIFIC EMBODIMENTS

Figure 1:
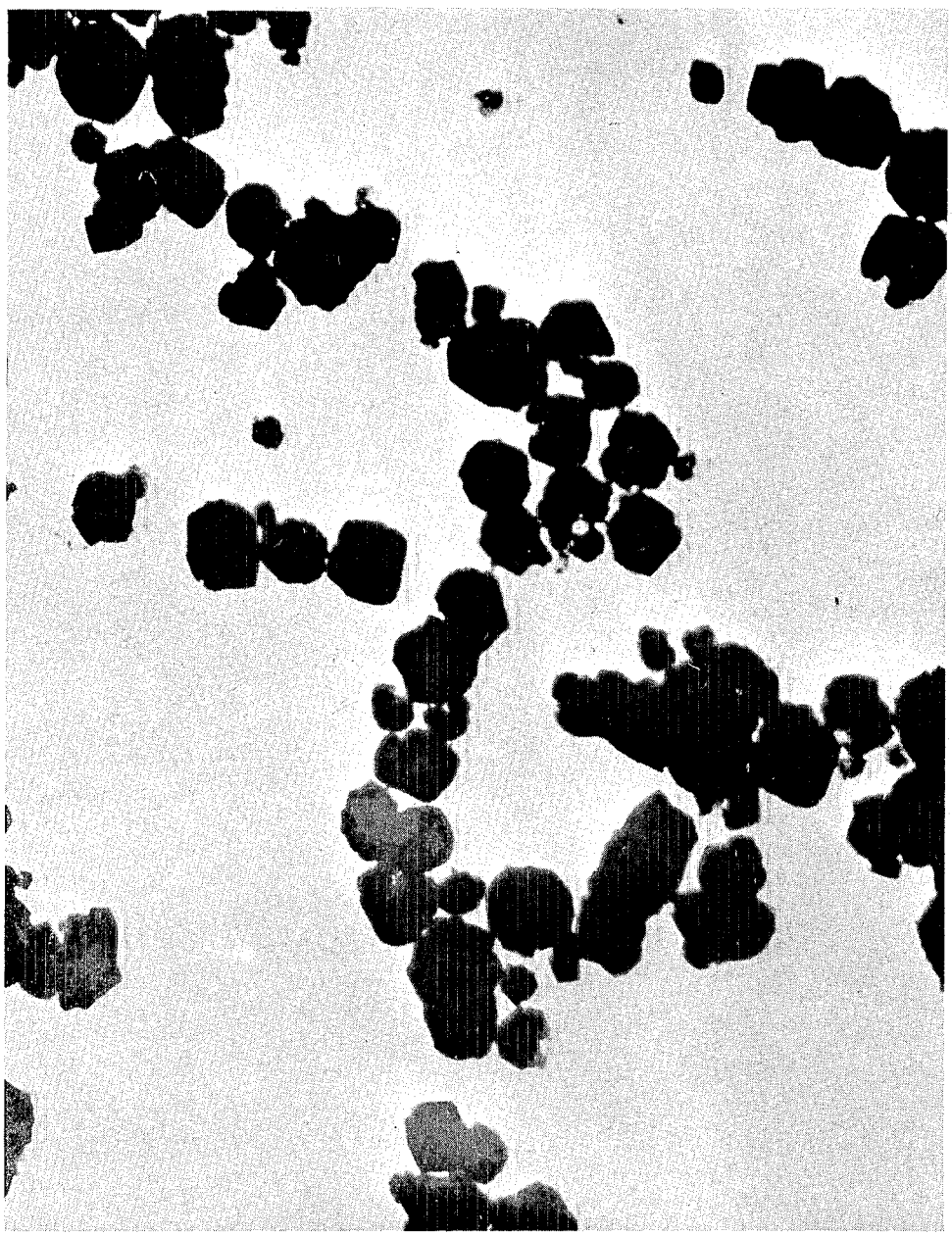
FIG. 1 is an electron photomicrograph (6300 magnification) of a synthetic faujasite crystalline aluminosilicate zeolite having a uniform pore diameter of about 13 angstrom units, which zeolite has not been subjected to either thermal treatment or cooling.

In accordance with one aspect of this invention, it has been found that the ratio of external surface area to internal surface area of a crystalline zeolite may be significantly increased by first heating such zeolite to an elevated temperature below that temperature at which loss of crystallinity occurs, and thereafter quenching the so heated zeolite in a liquid medium desirably maintained at a temperature of at least about 300° C. less than said elevated temperature.

The heat-quench treatment subjects the zeolite to drastic thermal shock and effects a significant reduction in particle size of the zeolite crystals without significantly affecting the crystallinity, i.e., maintaining the crystallinity at greater than about 75% of its initial value. The breaking up of the zeolite crystals into smaller crystalline particles by thermal shock tends to alter the particle shape; that is, particles having an initial regular shape tend to become converted to smaller particles of irregular shape. Of course, the smaller particles obtained by virtue of the thermal shock will have a relatively higher ratio of external surface area to internal surface area than did the original zeolite particles, prior to thermal shock.

The temperature to which the crystalline zeolite is heated (prior to the quenching step) may vary, depending upon the number of thermal shock treatments required to reduce the crystallite size to the desired value. Of course, the greater the temperature gradient between the heating temperature and the quenching temperature, the less the total number of heat-quench cycles required. In general, however, the minimum temperature to which the crystalline zeolite is heated should be at least about 400° C. Preferably, this temperature should be from about 500 to 700° C. In certain instances, temperatures in excess of 700° C. may be employed, provided that no appreciable loss occurs in crystallinity of the zeolite.

The residence time at such elevated temperature is merely that time required to bring the zeolite to thermal equilibrium. Thus, such residence time is generally of the order of but a few minutes. Preferably, the residence time for the elevated temperature treatment should range from about 15 to 30 minutes.

As regards the liquid medium which is used to effect quenching of the heated crystalline zeolite, there may be utilized virtually any liquid medium that is inert to and hence non-reactive with the crystalline zeolite. Suitable liquids include water, liquid nitrogen, liquid air, liquid helium, etc.

As previously pointed out, the temperature gradient between the elevated temperature of heating and the quenching temperature should be at least about 300° C. Preferably, this gradient should be at least about 400° C.

The following examples will further illustrate this invention. All parts are by weight unless otherwise stated.

EXAMPLES 1–5

Five commercial samples of synthetic faujasite (Linde sodium X) crystalline aluminosilicate zeolite were employed in these examples. Synthetic faujasite is, of course, iso-structural with faujasite and is characterized by uniform pores having a diameter of about 13 angstrom units. In each instance, a sample weighing 0.5 gram was employed. The crystal particles making up each sample were characterized by a particle size of from about 1 to 10 microns.

In Example 1, commercial powder, as received, was employed. An electron photomicrograph (6300X) was made of this powder and is shown in FIG. 1.

Figure 2:
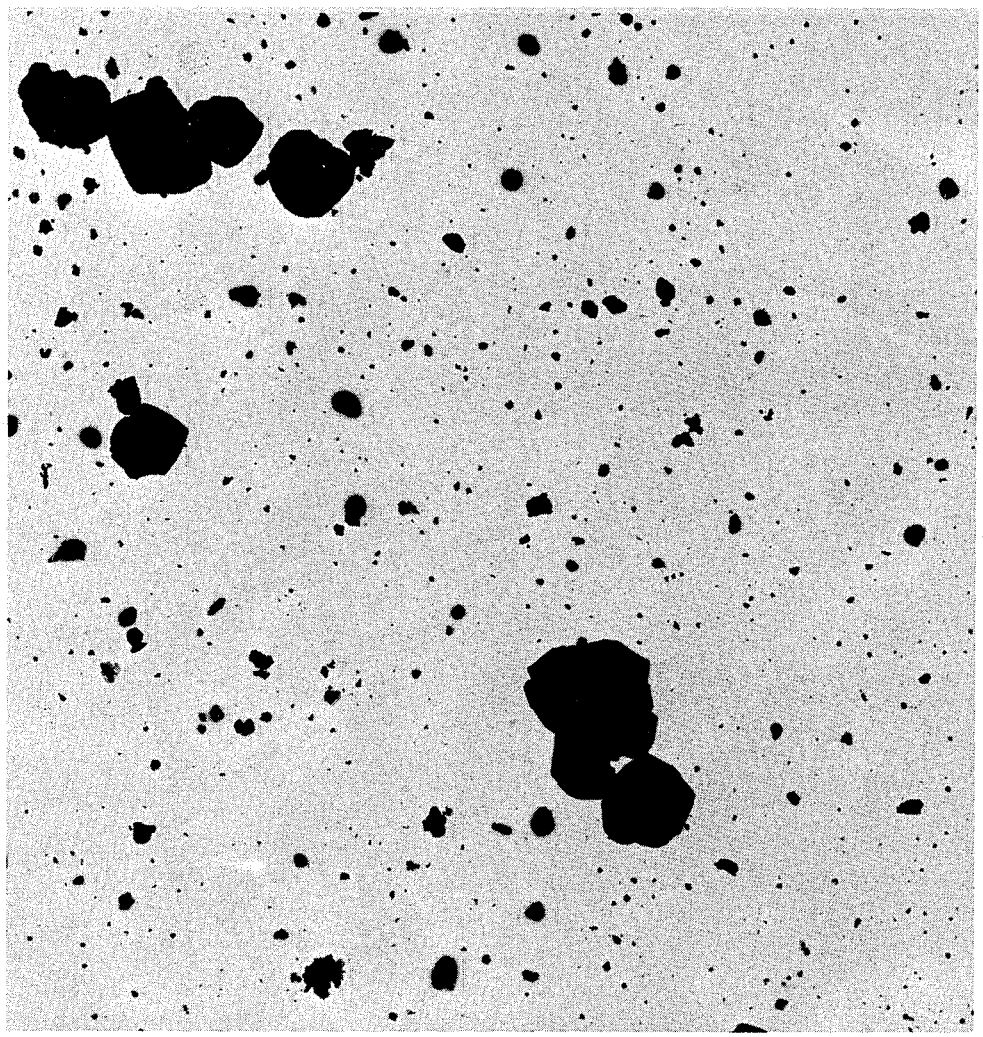
FIG. 2 is an electron photomicrograph (6300 magnification) of the same crystalline zeolite after having been subjected to a cycle of first heating to 600° C. for 15 minutes and thereafter quenching in liquid nitrogen for 15 minutes, this cycle having been carried out a total of ten times.

In Example 2, similar commercial powder was wrapped in nickel foil and then placed in a muffle furnace and heated at 600° C. for 15 minutes. Thereafter the sample was immediately quenched in a bath of liquid nitrogen at a temperature of −190° C. and permitted to remain immersed in the bath for 15 minutes. This was followed by an additional heat treatment at 600° C. for 15 minutes, followed by quenching in the liquid nitrogen bath, this cycle being carried out for a total of 10 times. An electron photomicrograph (6300X) was made of the resulting product and is shown in FIG. 2.

Figure 3:
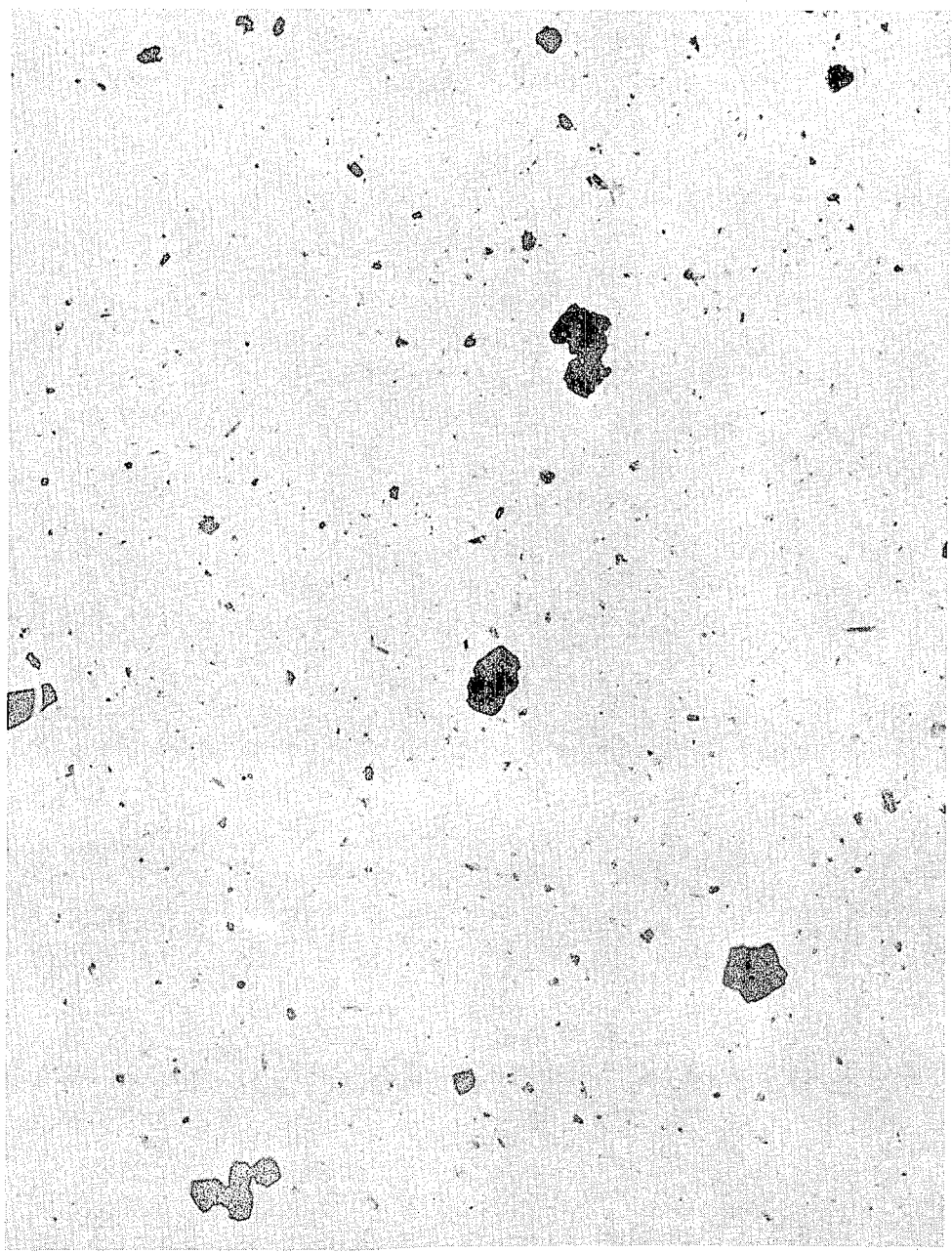
FIG. 3 is an electron photomicrograph (6300 magnification) for the same zeolite as employed in FIG. 1, such zeolite having been subjected to a cycle of first heating to 600° C. for 15 minutes and thereafter quenching in boiling water, this cycle having been carried out a total of twelve times.

In Example 3, similar commercial power was wrapped in nickel foil and then placed in a muffle furnace and heated at 600° C. for 15 minutes. Thereafter, the sample was immediately quenched in a bath of boiling water (100° C.) and permitted to remain immersed in the bath for 15 minutes. This was followed by an additional heat treatment at 600° C. for 15 minutes, followed by quenching in boiling water for 15 minutes, this cycle being carried out a total of 12 times. An electron photomicrograph (6300X) was made of the product and is shown in FIG. 3.

Figure 4:
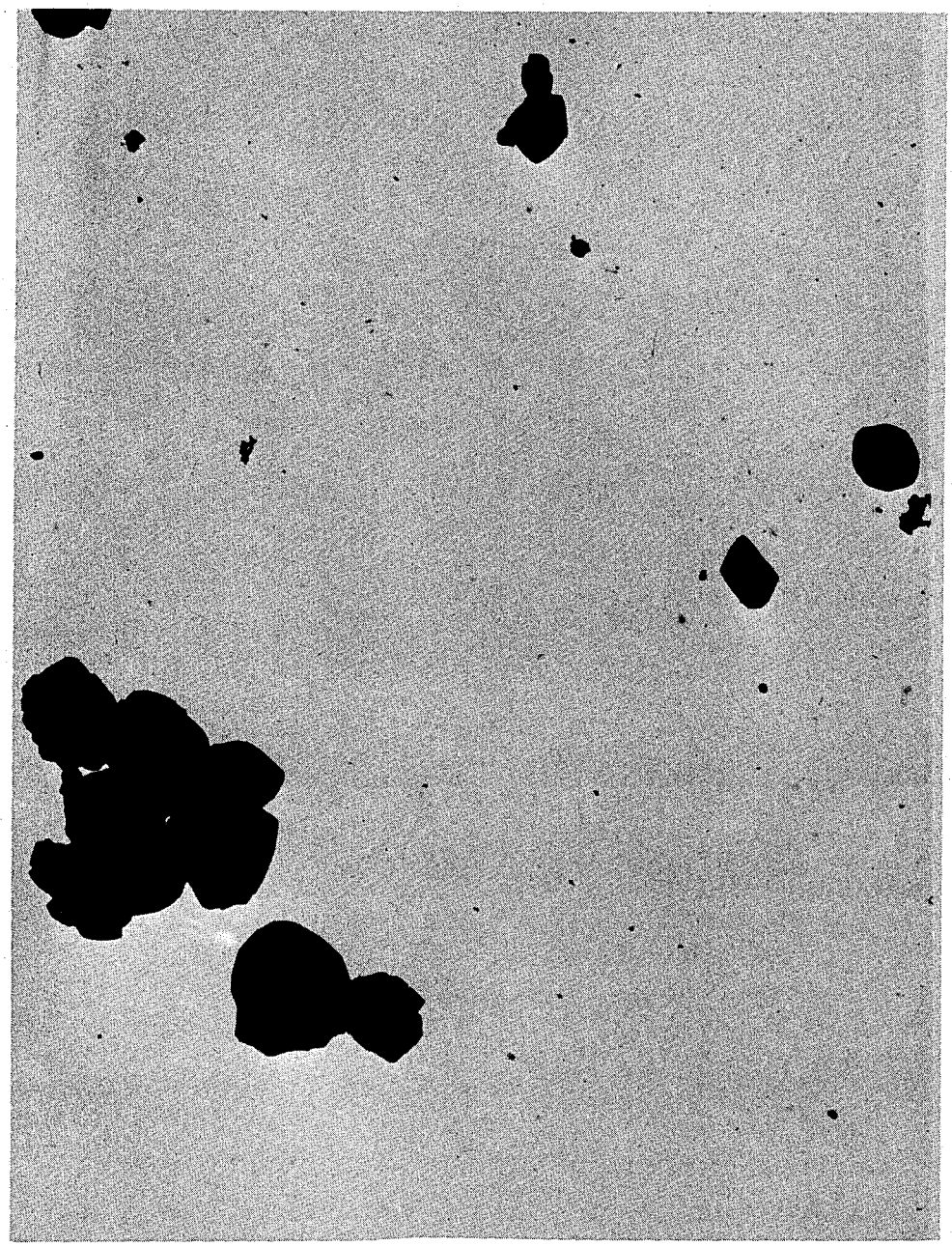
FIG. 4 is an electron photomicrograph (6300 magnification) of the same crystalline zeolite as employed for FIG. 1, this zeolite having been subjected to a cycle of first heating to 600° C. for 15 minutes and thereafter slowly cooling to room temperature, this cycle having been carried out a total of ten times.

In Example 4 the effect of slow rather than rapid cooling was investigated. Thus, the commercial powder was first heated to 600° C. for 15 minutes as described in Example 2, and thereafter the so heated product was permitted to slowly cool to room temperature (rather than being quenched in liquid nitrogen). This heat-cool treatment was repeated for a total of 10 cycles. An electron photomicrograph (6300X) was made of the resulting product and is shown in FIG. 4.

In Example 5, rather than utilizing thermal shock to effect a reduction in particle size (as in Examples 2 and 3) the commercial powder was ground for 4 minutes in a Beuler grinder.

In order to compare the crystallinity of the products of each of Examples 1–5, each of these products was subjected to X-ray diffraction.

DISCUSSION

A comparison of the X-ray diffraction patterns for the products of Examples 1–3 showed that the thermal shock treatments employed in Examples 2 and 3 resulted in but a slight loss in crystallinity (of the order of about 15%) as compared to the untreated control of Example 1.

The thermal shock was extremely effective insofar as reducing particle size. Thus, comparing the electron photomicrographs of Examples 1–3, it will be seen that the thermally shocking of the samples of Examples 2 and 3 resulted in a great number of small irregularly shaped particles.

The effect on crystallinity of heat treatment followed by gradual cooling, as described in Example 4, was shown by a comparison of the X-ray diffraction patterns for Examples 1 and 4. This comparison showed a more significant loss in crystallinity (of the order of about 25%) by virtue of such treatment, as compared to that which occurred when the crystalline powder was subjected to the thermal shock treatments of Examples 2 and 3 (about 15%). Additionally, a comparison of the electron photomicrographs of FIGS. 2 and 3 with that of FIG. 4 shows that gradual cooling as compared to rapid cooling (thermal shock) does not effect a significant reduction in particle size.

In Example 5, wherein the commercial powder was subjected to grinding for 4 minutes in a Beuler grinder, the X-ray diffraction pattern for the resulting product indicated a marked loss in crystallinity (approximately 50 percent).

While the foregoing examples have dealt with crystalline sodium aluminosilicate zeolites of the X type, it is to be understood that the method of this invention finds general application to all crystalline zeolities. Thus, it is applicable to such other crystalline aluminosilicate zeolites as, e.g., stilbite, erionite, chabazite, mordenite, clinophlolite, ferrurite, Y crystalline aluminosilicates, A crystalline aluminosilicates, L crystalline aluminosilicates, etc., as well as to crystalline aluminogermanates, crystalline galliosilicates, crystalline galliogermanates, and the like.

The products obtained by the method of this invention, which are characterized by a particle size smaller than that of the initial crystalline zeolite prior to thermal shock treatment, are most valuable in a wide variety of applications, e.g., as adsorbents, as the active component for hydrocarbon conversion catalysts, etc. Of particular importance is the fact that the products obtained by the method of this invention are characterized by a relatively higher ratio of external surface area to internal surface area than the corresponding ratio for the initial (non-thermal shocked) crystalline zeolite. Moreover, this higher ratio is obtained without significant adverse effect upon the crystallinity of the zeolite, which adverse effect has heretofore been consistently observed when employing such conventional techniques as grinding, subjecting to mechanical stress, or the like.

Variations can, of course, be made without departing from the spirit of my invention.

Having thus described my invention, what I desire to secure and claim by Letter Patent is:

1. A method for maintaining the crystallinity of a crystalline zeolite at greater than about seventy five percent of its initial value while reducing the particle size of the zeolite, this method comprising heating the crystalline zeolite to an elevated temperature below that temperature at which loss of crysallinity occurs and thereafter quenching said heated zeolite in a liquid medium, the temperature of said liquid medium being maintained at least about 300° C. below said elevated temperature.

2. The method of claim 1 wherein said elevated temperature is at least about 400° C.

3. The method of claim 2 wherein said elevated temperature is from about 500 to 700° C.

4. The method of claim 1 wherein the zeolite is heated at said elevated temperature for such time that it has reached thermal equilibrium.

5. The method of claim 1 wherein said zeolite is immersed in the quenching liquid for a period of time of at least about 15 minutes.

6. The method of claim 1 wherein said heating and quenching steps are repeated.

7. The method of claim 6 wherein said initial crystalline zeolite is characterized by an average particle size of from about 1 to 10 microns and wherein the resulting thermally shocked product is characterized by an average particle size of from about 0.05 to 10 microns.

8. The method of claim 1 wherein the crystalline zeolite is a crystalline aluminosilicate.

9. The method of claim 1 wherein said liquid medium is liquid nitrogen.

10. The method of claim 1 wherein said liquid medium is water.

References Cited

UNITED STATES PATENTS

| | | |
|---|---|---|
| 437,990 | 10/1890 | Hopper. |
| 502,181 | 7/1893 | Fauvel. |
| 1,679,857 | 8/1928 | France _____ 241—1 |
| 1,718,264 | 6/1929 | Walton _____ 241—1 |
| 2,460,742 | 2/1949 | Hatchard _____ 241—1 X |
| 2,943,982 | 7/1960 | Dahlin _____ 241—21 X |
| 3,399,838 | 9/1968 | Hanser _____ 241—8 |

ROBERT C. RIORDON, Primary Examiner

D. G. KELLY, Assistant Examiner

U.S. Cl. X.R.

23—111